United States Patent [19]

Werner

[11] 3,952,396

[45] Apr. 27, 1976

[54] METHOD FOR FABRICATING A SOFA

[76] Inventor: Harvey Albert Werner, 6531 Kessler Ave., Woodland Hills, Calif. 91364

[22] Filed: May 23, 1975

[21] Appl. No.: 580,361

[52] U.S. Cl. .................................... 29/416; 29/464; 29/469; 144/315 R; 144/316; 144/319; 156/250; 297/445

[51] Int. Cl.² ........................................ B23P 17/00

[58] Field of Search .............. 29/91.1, 91, 415, 416, 29/469, 428, 464, 467; 144/315 R, 316, 319, 309 R; 156/250; 297/460, 458, 445

[56] References Cited

UNITED STATES PATENTS

| | | | |
|---|---|---|---|
| 181,360 | 8/1876 | Osgood | 297/445 X |
| 646,290 | 3/1900 | Kratz | 297/460 |
| 1,140,964 | 5/1915 | Dittmar | 144/315 R |
| 3,564,700 | 2/1971 | Binek | 29/416 X |

*Primary Examiner*—Victor A. DiPalma
*Attorney, Agent, or Firm*—Craig O. Malin

[57] ABSTRACT

A method for fabricating a sofa, wherein an integral seat and back is formed by joining the sides of the boards together using a form to create a surface having an upward back portion and a horizontal seat portion. The seat is supported upon a pair of spaced apart legs. A pair of arms is constructed from blocks of wood by cutting through each block to form a convex piece and a mating concave piece. The backsides of the two pieces are joined to each other in a vertically offset manner to form joint surfaces. The upper offset portion is cut off and the remaining arm is joined to the seat utilizing its joint surfaces.

6 Claims, 8 Drawing Figures

METHOD FOR FABRICATING A SOFA

BACKGROUND OF THE INVENTION

This invention relates to the field of furniture, particularly to sofas.

Prior art sofas consist generally of a frame which is completely covered with upholstering materials. Such known sofas may be mass-produced for the general market. The mass-produced sofas do not have the distinctive high quality appearance desired by interior decorators and many discriminating individuals. Consequently, some sofas of the generally known construction are custom made. These custom made sofas are expensive and resemble in many ways the lower priced mass-produced sofas.

Interior decorators and discriminating individuals are always seeking distinctive furniture of obviously high quality. The mass-produced sofas do not meet these distinctive and quality requirements. While the known custom made sofas are more acceptable to such persons, they still resemble the cheaper sofas in many aspects, since they are fabricated in a similar manner.

Also known are sofas and benches constructed of wood or metal and frequently used out-of-doors. To provide the necessary rigidity, such wooden sofas are generally massive and graceless in appearance. While the known metal sofas are less massive in appearance, they are necessarily heavy and lack the warm appearance desired for indoor furniture.

Therefore, there exists a continuing need for distinctive sofas of obviously high quality suitable for interior decorating.

SUMMARY OF THE INVENTION

It is an object of the invention to provide a distinctive sofa of obviously high quality suitable for interior decorating.

It is a further object of the invention to provide a sofa of predominantly wooden construction which is sturdy while still having a graceful appearance.

According to the invention, a form is utilized to construct an integral back and seat from wooden boards that are joined together along their adjacent sides. The seat is supported upon a pair of spaced apart legs. A pair of arms is constructed from blocks of wood by cutting through each block to form a convex piece and a mating concave piece. The backsides of the two pieces are joined to each other in a vertically offset manner to form joint surfaces. The upper offset portion is cut off and the remaining arm is joined to the seat, utilizing its joint surfaces.

BRIEF DESCRIPTION OF THE DRAWINGS

The invention will now be described in detail with reference to the accompanying drawings representing preferred embodiments of the sofa according to the present invention. In the drawings.

DESCRIPTION OF THE PREFERRED EMBODIMENTS

Figure 1:
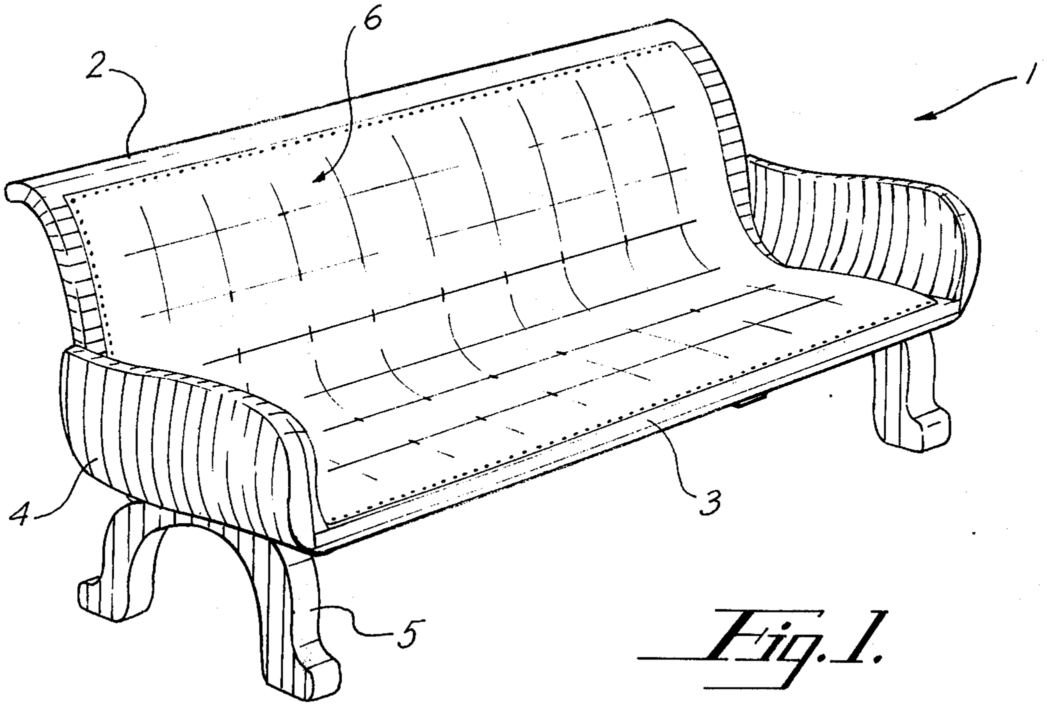
FIG. 1 is a perspective view of the sofa.

FIG. 1 is a perspective view of a sofa 1 with a back 2 formed integrally with a seat 3 in a curved manner. A pair of sculptured arms 4 are joined to the ends of the seat 3 and the lower portions of the ends of the back 2. These joints help stiffen the seat and back by tieing them together across their junction.

The sofa 1 is supported by a pair of spaced apart legs 5 joined to the underside of the seat 3. A soft pad 6 covered with upholstery material may be fastened to the seat 3 and back 2 by brass tacks 7.

Figure 2:
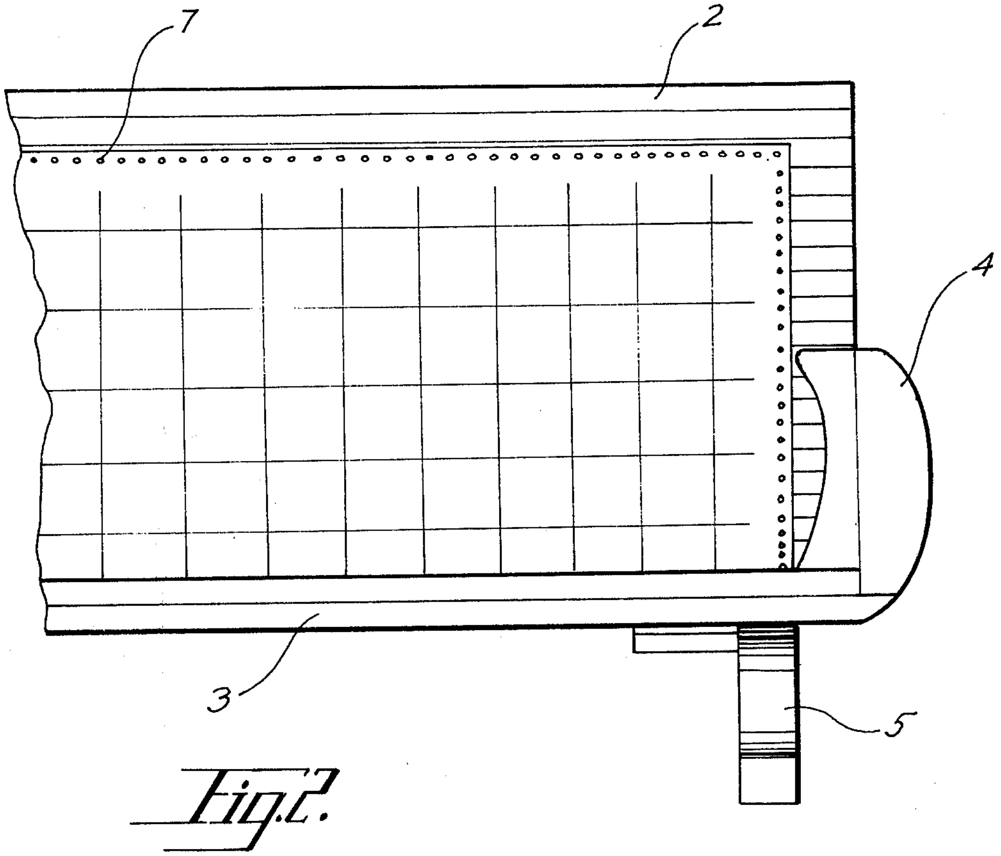
FIG. 2 is a partial front view of the left side of the sofa.

The sculptured arm 4 with its concave inner side and convex outer side is most clearly shown in FIG. 2. The sculpturing of the arm 4 and the curving of the other surfaces of the sofa 1 as shown in both FIGS. 1 and 2 eliminates the crude, block-like appearance commonly found with large wooden sofas.

Figure 3:
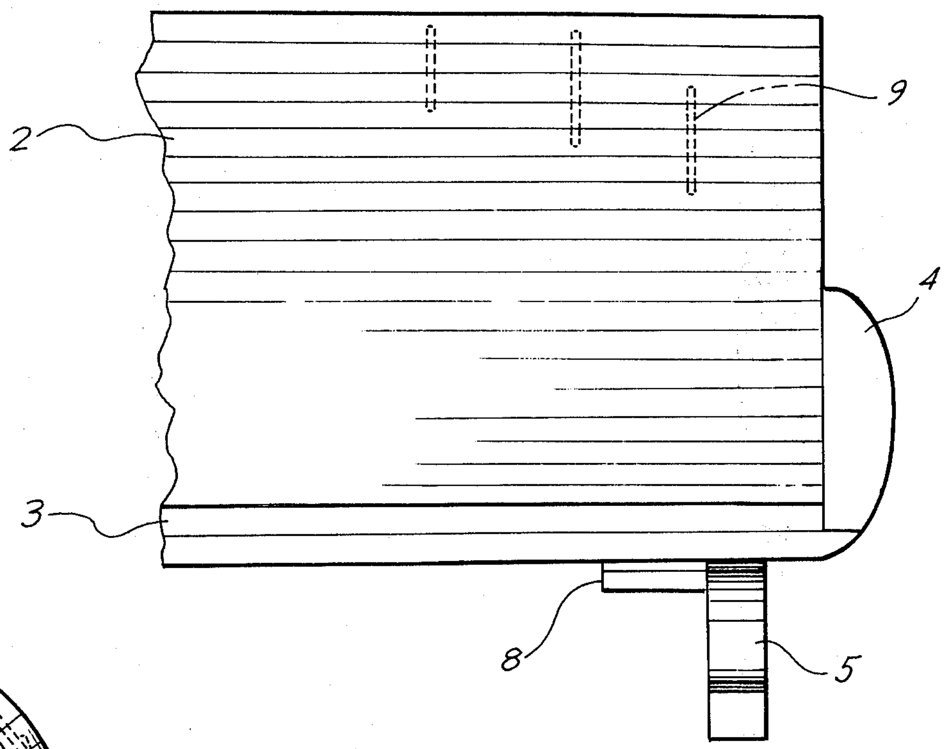
FIG. 3 is a partial rear view of the right side of the sofa.
Figure 4:
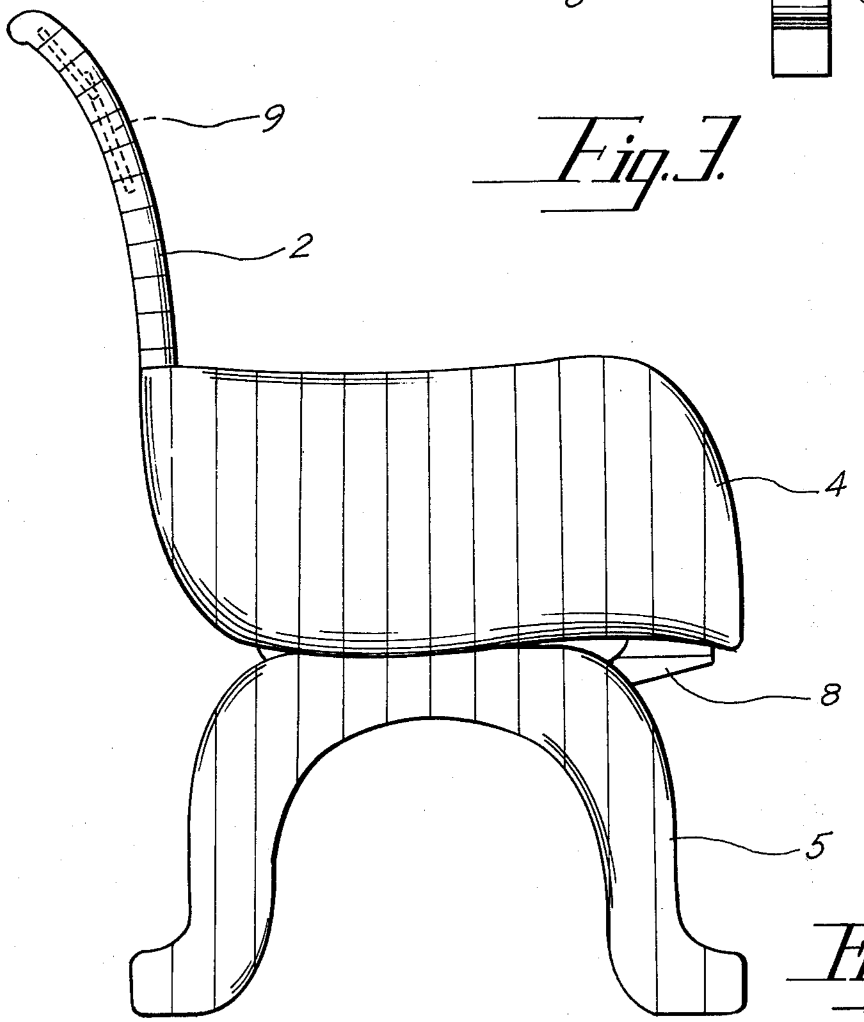
FIG. 4 is an end view of the sofa.

A brace 8 is utilized to strengthen the joint between the seat 3 and the pair of legs 5, as best shown in FIGS. 3 and 4. Because of its positioning and its tapered front and rear ends, the brace 8 is hidden from normal view.

Staggered metal dowels 9 can be placed completely inside the back 2 to stiffen it, although the back 2 can be satisfactorily made without such stiffening dowels. Since the back 2 is made by abutting adjacent sides of boards together, as discussed later, the dowels 9 can be totally hidden within the back.

Figure 5:
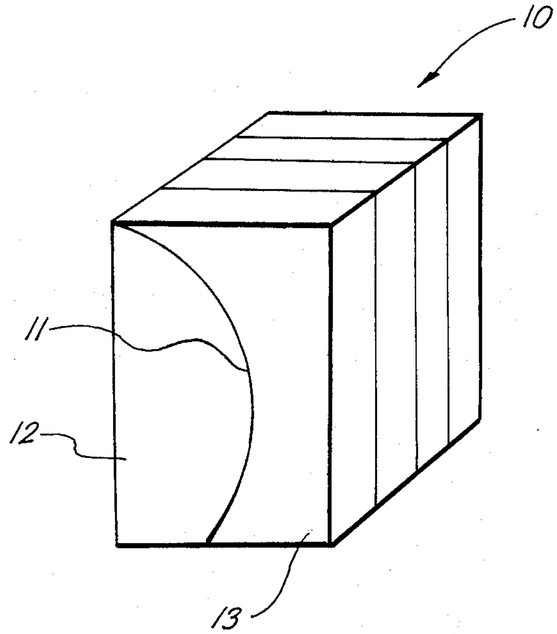
FIG. 5 is a perspective view of a block from which a sofa arm is cut.
Figure 6:
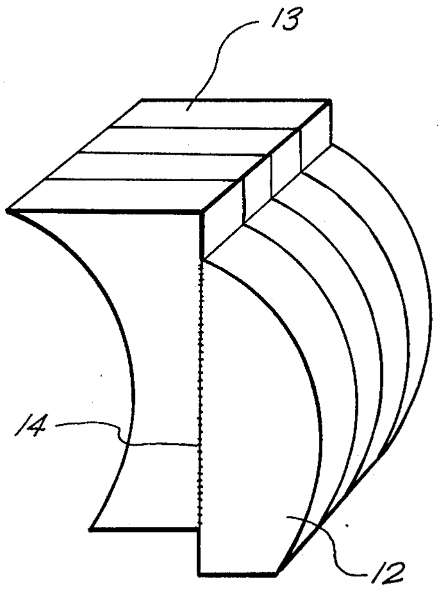
FIG. 6 is a perspective view of the block shown in FIG. 5 after it has been cut into two pieces and rejoined back to back.
Figure 7:
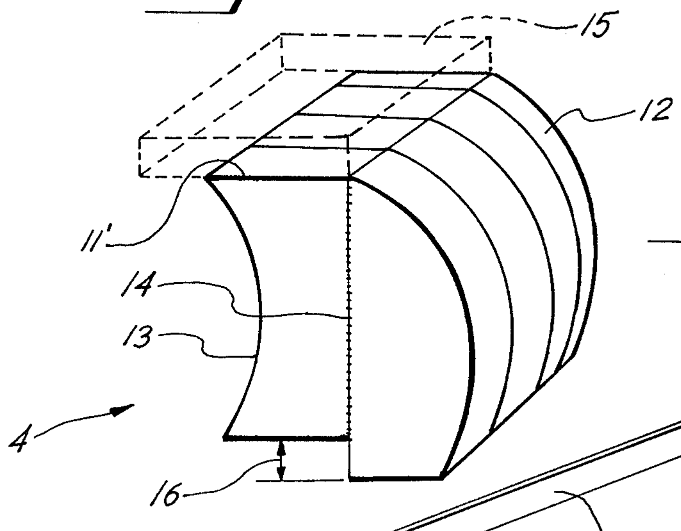
FIG. 7 is a perspective view of the block shown in FIG. 6 after the top portion has been removed.

The method by which the arms 4 are fabricated is shown in FIGS. 5 to 7. A generally rectangular block 10 is provided. In the illustrated preferred embodiment, the block 10 is fabricated by glueing together several 2 × 4 boards. Although a solid block of wood can be used to fabricate the arms 4, it has been found that the composited structure blends well with the seat 3 and back 2 and increases the attractiveness of the entire sofa 1.

The block 10 is cut into two pieces along curved surface 11 to form a convex piece 12 and a concave piece 13. A band saw can advantageously be used to cut curved surface 11. The planar backsides of the two pieces are then glued together along joint 14. The concave piece 13 is offset vertically a distance 16 from the convex piece 12. This provides a joint opening in the space 16 bounded by two surfaces at right angles to each other. The upwardly extending portion 15 of piece 13 is then cut off along surface 11'. Several blocks 10 can be joined together after cutting to lengthen the arm 4. As best shown in FIGS. 3 and 4, the periphery of the arms 4 can be rounded to blend into the back 2 and seat 3.

Figure 8:
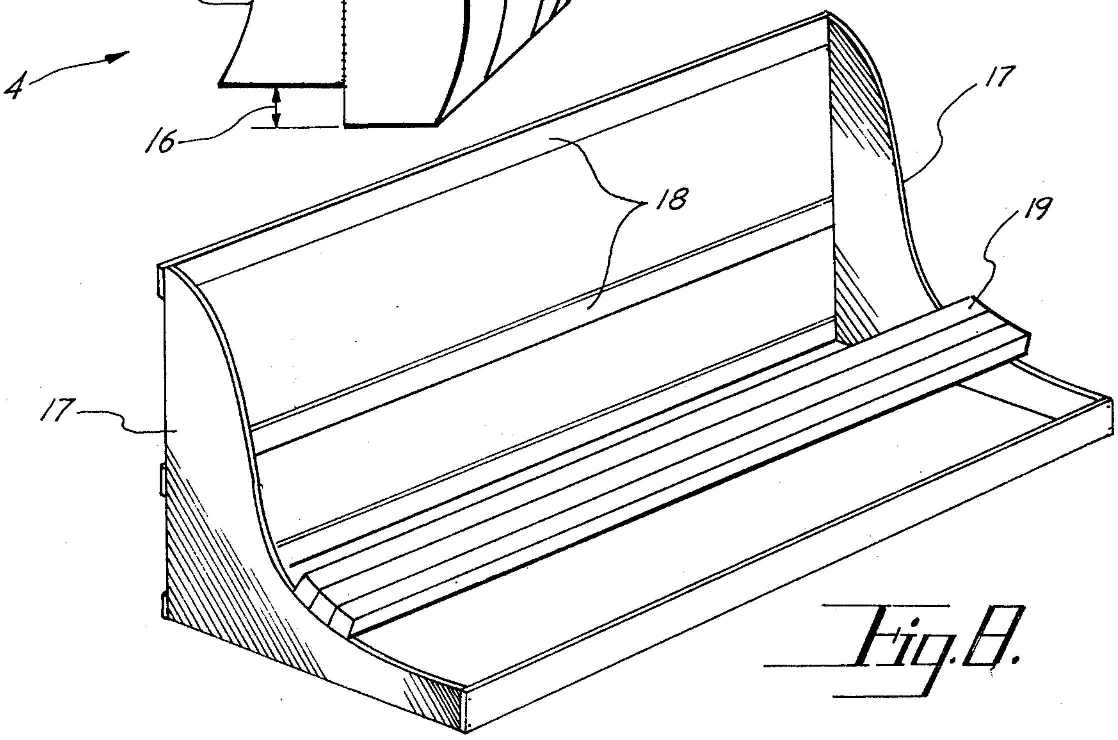
FIG. 8 is a perspective view of a form showing how the integral seat and back of the sofa is formed.

To form the integral back 2 and seat 3, a form is prepared by providing a pair of end members 17 with an edge having the desired seat contour, generally a curved L-shape such as shown in FIG. 8. The end members 17 are spaced apart by members 18.

Boards 19 having a quadrilateral cross-section are then placed on the edges of the form to span the space between the end members 17. Abutting sides of the boards 19 are joined together by a suitable means such as glueing and nailing. The cross-section of the boards 19 will vary somewhat from rectangular, particularly in the locations of the seat 3 and back 2 having the sharpest curvature. Two by two boards have proven to be satisfactory for forming the boards 19.

From the foregoing, it can be readily realized that this invention can assume various embodiments. Thus, it is to be understood that the invention is not limited to the specific embodiments described herein, but is to be limited only by the appended claims.

What I claim is:

1. A method for fabricating a sofa comprising:

providing a pair of spaced apart leg members;

constructing an integral seat and back by:

providing a form having spaced apart members, each of said end members having an edge extending to form a generally L-shaped contour, placing boards having a quadrilateral cross section on said edges to span the space between said end members, joining abuting sides of said boards to form a surface having an upwardly extending back portion and a generally horizontally extending seat portion;

joining the underside of said seat portion to the top of said pair of leg members, whereby said integral seat and back are supported by said pair of leg members;

constructing a pair of arms for said sofa by:

providing a generally rectangular block of wood, forming mating curved surfaces by cutting through said block to form a convex piece and a mating concave piece, joining the planar sides opposite said curved surface of each piece to each other so that said curved surfaces on the pieces face outwardly in opposite directions, said concave piece being offset vertically a short distance from said convex piece to form joint surfaces at right angles to each other, cutting off the upwardly extending portion of said vertically offset concave piece to form the top of said arm; and fastening respective arms of said pair of arms to respective ends of said integral seat and back by joining said right angle joint surfaces of respective arms to respective ends of said seat portion and by joining respective ends of said back portion to respective arms.

2. The method as claimed in claim 1, including inserting metal dowels across boards forming said back portion to stiffen said back portion.

3. The method as claimed in claim 1, wherein said boards forming said integral seat and back are shaped from 2 × 2 boards.

4. The method as claimed in claim 1, wherein said generally rectangular block is provided by joining together 2 × 4 boards.

5. The method as claimed in claim 1, including fastening upholstering on said integral seat and back.

6. The method as claimed in claim 1, including curving the periphery of said pair of arms to blend them into said integral seat and back.

* * * * *